Figure 1:
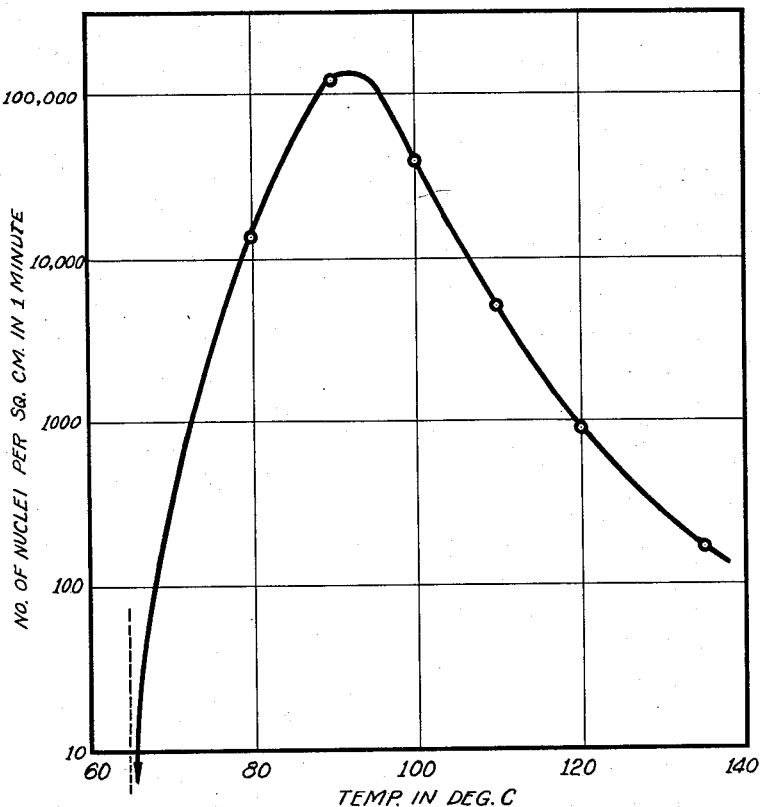

Aug. 18, 1953     A. VON HIPPEL ET AL     2,649,409
ELECTRODEPOSITION OF SELENIUM

Filed July 30, 1943     3 Sheets-Sheet 1

NUCLEAR FORMATION OF METALLIC SELENIUM IN GLASSEOUS SELENIUM AS A FUNCTION OF TEMPERATURE.

65° POINT OBTAINED FROM X-RAY DATA
80 AND 90° POINTS ESTIMATED FROM SPEED OF CRYSTALLIZATION
REMAINDER OBTAINED BY MICROSCOPIC EXAMINATION

INVENTORS
ARTHUR VON HIPPEL
M. C. BLOOM
BY
D. Y. Angus
ATTORNEY

INVENTORS
ARTHUR VON HIPPEL
M. C. BLOOM
BY
ATTORNEY

Patented Aug. 18, 1953

2,649,409

UNITED STATES PATENT OFFICE 2,649,409

ELECTRODEPOSITION OF SELENIUM

Arthur von Hippel, Weston, and Mortimer C. Bloom, Newton Highlands, Mass., assignors, by mesne assignments, to Federal Telephone and Radio Corporation, New York, N. Y., a corporation of Delaware Application July 30, 1943, Serial No. 496,760

1 Claim. (Cl. 204—38)

The present invention relates generally to the electro-deposition of selenium on conducting surfaces, and more particularly to the electro-deposition of selenium in the grey metallic form.

This is a continuation in part of our copending application Serial No. 420,906 filed November 29, 1941, (now abandoned).

It is an object of the invention to electrically deposit coatings of selenium of the grey crystalline metallic form.

It is a further object to electrically deposit such coatings of metallic selenium which shall be substantially free from amorphous red selenium.

It is a further object to deposit such coatings which shall be adherent, malleable, ductile, and resistant to abrasion, shock, and distortion.

It is a further object to deposit such coatings which shall be non-porous and corrosion-resistant.

It is a further object to deposit such coatings which shall be capable of being used as elements of electrical resistors, rectifiers, photocells, etc.

In the past, the form of selenium which most frequently resulted from chemical reactions such as those which were employed in experiments on electro-deposition, was the non-metallic amorphous form known as "red amorphous" selenium. The grey metallic form of selenium, when desired, was usually produced from the red amorphous form thereof by suitable heat treatment. So far as we are aware, no methods have ever been discovered of electro-depositing selenium in its metallic form.

In accordance with the present invention, however, we have discovered that selenium may be electro-deposited in its grey metallic form by employing an electro-deposition bath containing an ample supply of quadrivalent selenium cations, that is, cations containing selenium in the quadrivalent state. Two examples are: $Se^{+4}$ and $SeO^{+2}$.

Although there are several different possible ways of producing quadrivalent selenium cations, it appears that any bath which will give an adequate supply of these ions can be adapted for electroplating grey metallic selenium, provided either that such bath does not at the same time furnish a substantial supply of other positively charged ions whose critical deposition potential in respect to the cathode material and operating conditions is as low as, or lower than, that of the quadrivalent selenium cations, or that of any such low-deposition-potential positive ions which may be furnished are such that in discharging they do not interfere with the deposition of grey selenium.

$SeO_2$ solutions (selenious acid) containing a substantial quantity of other acid in order that an ample supply of hydrogen ions may be present in addition to the selenium cations are suitable bath solutions in which the desired supply of quadrivalent selenium cations may be had resulting in the desired deposit of grey metallic selenium.

We have also discovered that even though the concentration of quadrivalent selenium cations is not ordinarily sufficient to produce a metallic deposition, the desired metallic deposition may nevertheless be had by introducing other conditions. One such condition is the use of a high bath temperature. Thus, we have discovered that an $SeO_2$ solution without an excess of acid may be used provided the temperature of the solution is sufficiently elevated, for example, approaching 100° C. or higher.

For practical purposes, this expedient is not as satisfactory as the use of an excess of acid because a greater amount of the deposit and at a much faster rate can be had by use of the solution containing the excess of acid than when no excess of acid is used. When an excess of acid is used a deposit may be had at any temperature within a wide range of temperatures; for example, a deposit can be obtained at a low rate by the use of small current densities even at room temperature when there is a sufficient excess of acid, although elevated temperatures within practical limits give better and more practical results. A bath temperature of around 100° C. has been found to give very satisfactory results permitting a rapid deposit with high efficiency, resulting in a uniform fine deposit of metallic selenium free from corrosion and pitting.

We have further discovered that metallic selenium can be deposited on cathodes of specific materials even under conditions where no metallic deposition could be obtained on ordinary cathodes. One such specific cathode is one having a metallic selenium coated surface; metallic selenium may be deposited on it even under conditions where there is not a sufficient quadrivalent selenium cation concentration or a sufficiently high bath temperature to produce a metallic deposit on an ordinary uncoated cathode. Other specific cathodes which can be used similarly to the metallic selenium cathode for this purpose are selenided cathodes and tellurium cathodes. One method of preparing such cathodes has been disclosed in the copending application, Serial No. 402,103, filed July 12, 1941, by Arthur von Hippel, upon which Patent No. 2,408,116 was issued September 24, 1946. This patent discloses that a surface of nickel, copper, zinc, iron, tin, steels and magnesium-aluminum alloys is reacted upon by solution of selenium dioxide whereby a selenide coating is formed on the surface.

We have furthermore discovered that the metallic selenium electrodeposition is facilitated by use of an electrolyte which is capable of dissolving selenium; and we have found that such solvent solutions permit depositions even at low temperatures, such as room temperature, under conditions where ordinarily there would be insufficient quadrivalent selenium cations or insufficiently high temperature to produce the metallic deposition. Apparently the presence of the solvent action is needed at temperatures below 50° C. even when there is a preponderance of quadrivalent selenium cations. The solutions can be made to act as solvents by the use of hydrochloric or sulphuric or perhaps nitric acid.

Figure 2:
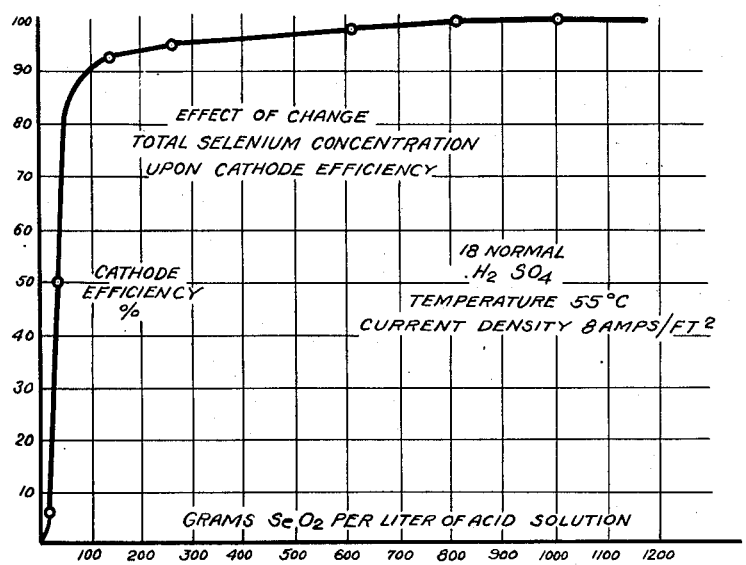
Figure 3:
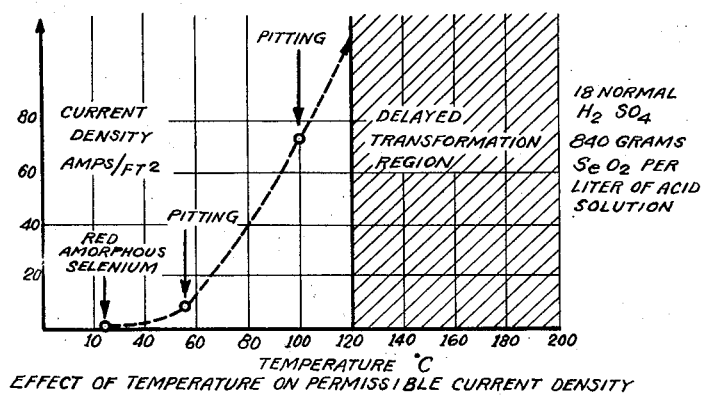
Figure 4:
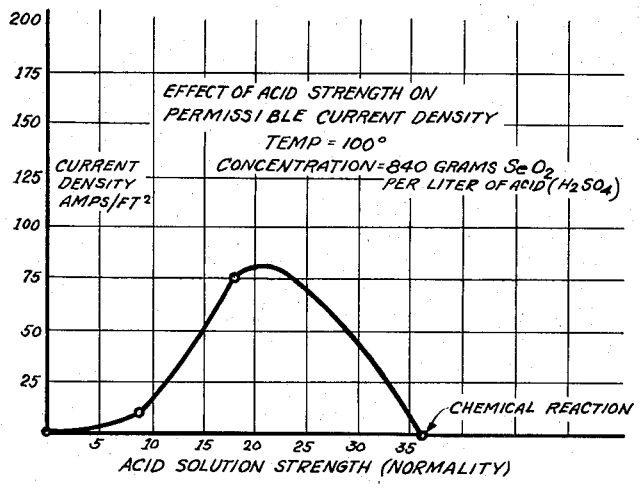
Figure 5:
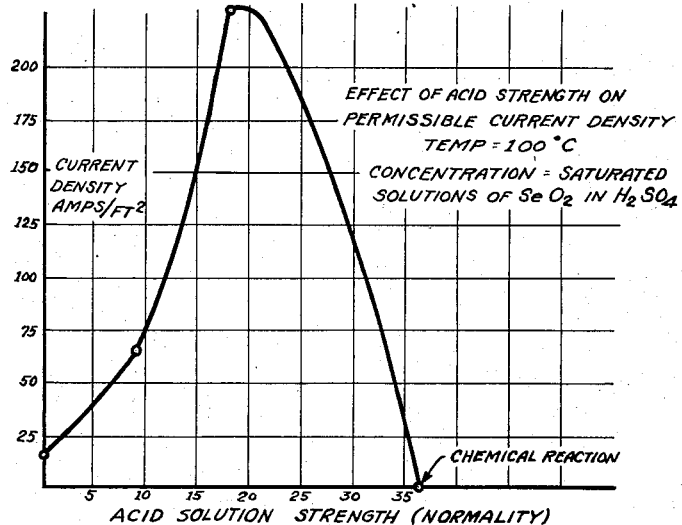

In the drawings, Fig. 1 represents the relation between temperature and rate at which nuclei of metallic selenium are formed. Fig. 2 depicts the variation of cathode efficiency as a function of $SeO_2$ concentration. Fig. 3 shows the effect of temperature on permissible current density. Figures 4 and 5 are graphs of permissible current density versus acid strength. For Fig. 4 the content of $SeO_2$ was fixed at 840 grams per liter of solution, whereas for Fig. 5 the acid solutions were saturated with $SeO_2$.

In practicing our invention we have found that the factors of $SeO_2$ concentration, acid concentration, temperature and current density should be kept within proper limits and be maintained mutually consistent with each other to produce the best quality of metallic deposit. These factors operate as follows:

(a) Increasing the $SeO_2$ concentration increases the tendency toward metallic selenium deposit.

(b) Increasing the acid concentration increases the tendency toward metallic selenium deposit except, however, solutions which are too strongly acid should not be used at too high a temperature, otherwise they may attack the material being plated; and furthermore, too much acid at too low a temperature should not be used, otherwise it may make the $SeO_2$ precipitate out.

(c) Increasing the temperature of the bath increases the tendency toward metallic selenium deposit, provided, however, that the temperature must not be raised too high if a fine grain deposit is desired. For example, a temperature above about 120° C. tends to create a coarse, rough grain. Furthermore, a temperature very much in excess of this may tend toward excessively slow gray crystal formation, leaving a type of red selenium deposit which may not disappear until plating has taken place for an excessive time.

(d) Decreasing the current density tends to produce the metallic type of selenium deposit; and when the current exceeds a certain amount for any given set of the other three conditions there is a tendency toward the red amorphous deposit. The effect of the foregoing factors on the electrodeposition on the metallic selenium can be observed from the following examples of variations in these factors.

The preferred method of producing a bath adequate for the electro-plating of metallic selenium is as follows:

Selenium dioxide $SeO_2$ is dissolved in large quantities in an aqueous bath which also contains an acid, e. g., $H_2SO_4$. The positive hydrogen ions from the acid tend to favor the production of quadrivalent selenium cations by combining with the oxygen of the $SeO_2$ compound and forming water. We have found that such acids as sulphuric acid ($H_2SO_4$), selenic acid ($H_2SeO_4$), nitric acid ($HNO_3$), and hydrochloric acid (HCl) are especially suitable for enhancing the concentration of quadrivalent selenium cations. For simplicity it may be convenient to consider a theoretical explanation of the reaction to be as follows:

or

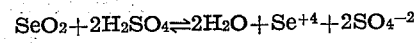

Actually, since the reaction occurs in an aqueous solution, the $SeO_2$ should probably be considered as forming selenious acid with the water of the bath, and therefore the reaction might more properly be written as follows:

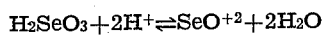

or

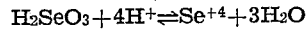

The above might also be written as a single two-step reaction, thus:

(1) 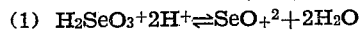

and (2) 

In these latter equations the negative radical of the acid is omitted, since only the hydrogen ion of the acid is effective in increasing the concentration of quadrivalent selenium cations. The concentration of the quadrivalent selenium cations is sufficient for the purpose when nearly all the cathode current is carried by these cations.

In order to obtain a deposit of grey metallic selenium using an aqueous electrolyte, it is not enough to insure the presence of the quadrivalent selenium cations, but proper operating conditions must be maintained as well. Thus, at low temperatures it is necessary to limit the applied voltage to such values that the resulting current can readily be carried by the available quadrivalent selenium cations. Under these conditions a high "cathode efficiency" is obtained and the evolution of hydrogen at the cathode is avoided or reduced to a harmlessly low value. It has been found that when an excessive amount of hydrogen gas is evolved—by passing a current too great to be readily carried by the quadrivalent selenium cations—the selenium deposit produced is of the amorphous red form rather than the desired grey metallic form. It is believed that the reason for this is that the high concentration of nascent hydrogen atoms in the solution at the cathode tends to produce from the $SeO_2$, Se atoms which form amorphous aggregates. The spongy nature of the amorphous deposit supports this assumption. The current density at which this phenomenon becomes pronounced is much less at lower temperatures than at elevated temperatures. In accordance with our invention, therefore, it is proposed not only to select the ingredients of the bath as outlined above, so as to produce a supply of the quadrivalent selenium cations, but also to regulate the current density to such a value that nearly all the cathode current is carried by these cations.

A further factor of major importance must be taken into consideration for the prescription of proper operating conditions. In the general field of crystal growth phenomena, and particularly in the field of the generation of different polymorphous forms, it has been well established that the particular crystalline form, as well as the size of the crystals generated, is profoundly influenced by the temperature. Crystal nuclei producing the crystal type desired, form only in a limited temperature range, and the growth velocity of such nuclei into a more or less fine crystalline deposit is another function of the temperature. We have established that in the case of selenium, the generation of the grey metallic variety from the ordinary amorphous form by nuclei formation has a temperature characteristic substantially that given by Fig. 1. The rate of formation of nuclei of the grey form passes through a maximum in the neighborhood of 90° to 100° C., and drops steeply on either side of this interval to low values. If the bath is operated at temperatures at which the transformation velocity from the red into the grey form is very low, any red material generated stays as such for a long time. If, on the other hand, the bath temperature is kept at a level corresponding to rapid nuclei formation, any selenium discharged in the red modification transforms so rapidly into the metallic selenium that interference with the plating process by this modification is avoided. For instance, it is possible to electroplate grey selenium in the preferred temperature range indicated by Fig. 1, at such high current densities that substantial amounts of hydrogen are evolved—a procedure leading, at low temperature, e. g., room temperature, to the formation of disturbing quantities of red selenium.

Apart from the temperature factor, there is the further factor of importance, namely the solubility of selenium in the bath. If the bath be active as a solvent, red selenium which might deposit at the cathode will dissolve and redeposit as grey selenium. Baths found suitable as solvents are: (1) concentrated HCl containing about 10% to 50% by weight of $SeO_2$ and (2) 18% by weight of $SeO_2$ in $H_2SO_4$ the strength of which varies from about 50% to 90% by volume.

As an example of the importance of these conditions of high temperature and of solubility, the case of a $SeO_2$ bath without excess of acid may be considered. Metallic deposition cannot be had in it at temperatures below about 50° C. as selenium is not soluble in it. But if the temperature be raised well above 50° C., such as around 100° C., this higher temperature converts the film of red deposit initially formed to metallic grey form; and subsequent plating is in the metallic form. If on the other hand, the solubility of selenium in the solution were increased as by the HCl or $H_2SO_4$ noted above, the red film which would be formed, would also be converted to the grey even below 50° C.

We have furthermore established that once a deposit of the grey form has been obtained, it is subsequently possible to continue plating outside of the preferred temperature range, because the already existing grey material forces the incoming new atoms into its configuration. Therefore, in this situation plating is possible under operating conditions which would produce red selenium if originally applied to the bare cathode surface. Consequently it is advantageous to start plating with a low current density, and to step up the current after a sufficient coverage by grey selenium has been obtained. It will thus be seen that according to our invention not only the choice of the compounds dissolved in the bath but also the adjustment of the concentration, the current densities, and the temperatures and solubility are important for attaining the desired result of depositing grey metallic selenium free from the formation of substantial quantities of red amorphous selenium.

If not only a deposit of selenium in the grey modification as such is desired, but also its deposition in a smooth layer without pores, additional precautions are necessary. Gas evolved from the cathode, or migrating towards it, has the tendency to form tenaciously adhering bubbles on the cathode surface, especially in viscous electrolytes. At these spots where the bubbles adhere, deposition of selenium is prevented and pits are left in the final deposit. Reduction of the viscosity of the solution by increasing the temperature, or by decreasing the concentration, or by removal of the bubbles by agitation is necessary if the interfacial tension cannot be adequately lowered by wetting agents.

In order to illustrate as specifically as possible the effect of the variables mentioned above on the character of the deposit, we give the following quantitative examples:

A bath composed of selenium dioxide in sulphuric acid solution, containing 18 normal $H_2SO_4$ at a temperature of 55° C., will be chosen as the first example. To find the proper $SeO_2$ concentration, we measure the cathode efficiency (i. e., the percentage of the current which is carried by quadrivalent selenium cations) of the bath as a function of selenium dioxide content (Fig. 2). Reasonably satisfactory results for some purposes can be obtained even when the current density is so high that only about 65 percent of the cathode current is carried by the desired quadrivalent selenium cations. It is preferred, however, to operate under conditions where at least 80 percent (and preferably more than 95 per cent) of the cathode current is carried by these ions. As this characteristic curve indicates, at slightly over 800 g. of $SeO_2$ per liter of 18 normal sulphuric acid, 100-percent efficiency is reached for current densities of about 8 amp./sq. ft. Hence a solution of 18 normal sulphuric acid, containing 840 g. of $SeO_2$ per liter and operated at only 55° C. with a current density of 8 amp./sq. ft. would carry the full current by quadrivalent selenium cations and give a deposit of metallic Se at the cathode without evolution of hydrogen. But, due to the high viscosity and surface tension of the solution, bubbles from occluded gas or from gas diffusing from the anode may adhere tenaciously to the cathode, producing pits in the deposit. An increase in bath temperature is advisable to lower the viscosity and also to allow plating with higher current densities. It will be noted from Figure 2 that the cathode efficiency rapidly drops off when less than 150 g. of $SeO_2$ per litre of solution is used.

Fig. 3 illustrates the effect of temperature on the maximum plating current permissible for a bath containing 840 g./liter $SeO_2$ and the acid strength of 18 normal $H_2SO_4$ used above. The effects limiting further raising of the current in the different temperature ranges are indicated. At the still lower 25° C., a limiting factor is the formation of a deposit of ordinary red amorphous selenium which occurs even with current densities below 1 amp./sq. ft. At 55° C. a limiting factor is pitting by bubble formation, as already pointed out above. At 100° C. the current density can be raised to 75 amp./sq. ft. before the bubble phenomenon interferes. At 125° C., 230 amp./sq. ft. can be used without significant bubble evolution, but at this temperature and to a much more pronounced degree at 150° C., the decreasing rate of nuclei formation interferes (see Fig. 1). Any slightest film of red selenium which may form tends to persist at these temperatures. The conversion from amorphous red selenium to the grey crystalline form is reasonably rapid once a nucleus is started, but such nuclei are slow to form. The result is that comparatively few nuclei are formed, and then the conversion to the grey form centers on these few nuclei. This produces a rough deposit of relatively large metallic crystals in circular bunches. Preferential deposition takes place on these clusters, further roughening the structure.

If this effect is not objectionable (e. g., if the electro-deposit is effected solely for the purpose of purifying the selenium, or for some other purpose where an irregular grain structure is unimportant) the temperature region above 120° C. may be employed. If an even grain is desired, however, the higher temperatures are not recommended for plating on the bare cathode because an extremely great reduction of current density would be required to give a fine even grain at such temperatures. If a cathode is used covered already with a smooth deposit of grey selenium, this limitation will not exist. Consequently the temperature region around 100° C. is most appropriate for achieving a smooth deposit with reasonable speed upon a bare cathode, although otherwise the temperature region above 120° C. may be employed as above mentioned.

Now, using a bare cathode in a sulfuric acid bath and keeping the temperature at 100° C. and keeping the $SeO_2$ concentration at 840 g./liter at 100° C., the acid strength of the bath may be varied. Fig. 4 shows the highest permissible plating current as a function of acid strength. Without acid, considerable evolution of hydrogen takes place even at current densities below 1 amp./sq. ft. on account of the low quadrivalent selenium cation concentration; the deposit, therefore, becomes pitted. At 9 normal $H_2SO_4$ the same limitation appears at about 10 amp./sq. ft.; at 18 normal, as already mentioned, the current density may be raised to 75 amp./sq. ft. before this phenomenon becomes serious. Further increase in acid strength brings the solution into the region where the 840 grams of $SeO_2$ per liter of acid are not completely soluble (solubility limit).

Assuming that 18 normal $H_2SO_4$ at 100° C. thus has been established as a favorable condition, an increase in $SeO_2$ concentration may promise even higher current densities without hydrogen evolution. Fig. 5 shows a situation analogous to Fig. 4, but the solutions are saturated with $SeO_2$. As anticipated, much higher current densities can be carried before hydrogen bubbles pit the deposit; now at 18 normal $H_2SO_4$, more than 200 amp./sq. ft. can be used. At full acid concentration (36 normal $H_2SO_4$) a chemical reaction takes place at the cathode surface and no deposit is obtained.

The facts stated so far for sulphuric acid solutions only, are substantially the same for selenic acid solutions. In hydrochloric acid, favorable conditions have also been found. The chemical attack described above for concentrated sulphuric acid is not encountered with hydrochloric acid, and its viscosity is lower. The normally objectionable volatility of hydrochloric acid disappears if sufficient quantities of $SeO_2$ are dissolved therein. Nitric acid, while having the good properties of hydrochloric acid as far as viscosity and hydrogen ion concentration goes, has the disadvantageous reactivity of sulphuric acid in high concentrations.

Excellent deposits can be obtained on platinum, nickel, silver, antimony, also steel and other metals.

In the case where the metal used for the cathode is one which is readily attacked by the acid used in the bath, however, certain special precautions may be necessary. One very suitable procedure is to connect up the current source in reverse polarity before immersing the "cathode." Thus, when this "cathode" is first immersed it is actually an anode and the positive hydrogen ions are kept away from the metal of the "cathode." A thin coating of a selenide, selenate (or possibly some other compound) of the "cathode" metal appears to be thus formed. Now the current is reconnected in its regular polarity so that the cathode is negative and plating commences. The thin protective coating appears to have no substantial deleterious effects but does protect the metal from the action of the positive hydrogen ions which might attack it at the commencement of plating, with consequent prevention of pitting or red amorphous selenium deposition. The formation of red selenium is thus prevented by a seleniding of the cathode. For instance, a bath containing selenic acid for the above-described brief reverse current treatment of the "cathode" may be used even if some other bath is to be used for the actual plating, since the formation of a selenide or selenate (or other compound) which results from such treatment is particularly advantageous as a preliminary to the plating of selenium upon the cathode.

Where it is possible to do so, it is preferred to choose the acid to be employed with respect to the metal employed as a cathode so as to prevent attack of the cathode by the acid. Where it is necessary or desirable from the standpoint of speed or economy to employ, as the cathode, a metal which tends to react with the acid used in the bath, special precautions must be taken in initiating the plating in order to prevent the acid from acting on the cathode before the selenium plating is started. In some cases such adverse action can be substantially avoided by arranging that the current shall be applied as soon as the cathode is inserted into the bath, e. g., by connecting up the wires and turning on the current source before immersing the cathode.

The electrodepositions made in accordance with our invention are useful either for the purification of selenium or in the making of rectifiers or photocells or resistors for corrosion protection. For use as rectifiers or photocells it is desired that the crystalline structure be fine and built up to a uniform thickness. A rectifier will ordinarily require a thicker deposit than a photocell. For the rectifier and photocell use, if a base cathode is used, it will ordinarily be desired to deposit the selenium at a temperature below 120° C. and preferably around 100° C., in order to avoid the coarse porous type of deposit. If, however, the cathode is selenided before or upon immersion in the electrolyte, the electrodeposition results in a formation of gray selenium, the subsequent deposit will continue to be gray, as previously stated, and there will be no coarse grain due to the absence of the red selenium, even though the temperature is considerably above or below these values. Purification will arise from the fact that impurities in the selenium used for the deposit either will not deposit on a cathode at all or else have a threshold value of deposit above that at which the selenium is being deposited on the cathode; so that these impurities are left behind and are not deposited. For purification purposes it will usually not be so important whether the deposit is coarse or fine and the temperature at which the bath is operated can accordingly be given a greater latitude than when a uniform fine-grained deposit is desired, for example a temperature within the limits of about 50° C. or 75° C. to about 145° C. or 160° C. might be used; and higher temperatures than 100° C. might in some cases be preferable owing to the greater permissible current density at which metallic selenium can be deposited free from red selenium at the higher temperatures. For example, a temperature of 120° C. or more may be desirable. For most purposes, however, around 100° C. is probably best, as this is the temperature range at which the crystal nuclei tend to form most rapidly. Selenium deposited for purification purposes can be scraped off the cathode and used elsewhere as desired.

What is claimed is:

The process for electrodepositing gray crystalline metallic selenium upon a surface of an article having a metallic surface from the group consisting of nickel, silver, antimony and steel, that comprises producing an initial coating of a selenide of said surface metal thereon, and then making the article the cathode in an electrolyte consisting of an aqueous solution of sulphuric acid having a concentration of about 18 normal, and having between 150 grams of selenium dioxide per litre and sufficient selenium dioxide to form a saturated solution dissolved therein, maintaining the temperature of said electrolyte between 55° C. and 120° C., and maintaining the current density between 8 amperes per square foot and 230 amperes per square foot.

A. VON HIPPEL.
MORTIMER C. BLOOM.

References Cited in the file of this patent

UNITED STATES PATENTS

| Number | Name | Date |
|---|---|---|
| 1,743,160 | Presser | Jan. 14, 1930 |
| 2,197,497 | Geisler et al. | Apr. 16, 1940 |
| 2,202,532 | Malcolm | May 28, 1940 |
| 2,266,922 | Thompson et al. | Dec. 23, 1941 |
| 2,408,116 | Von Hippel | Sept. 24, 1946 |

FOREIGN PATENTS

| Number | Country | Date |
|---|---|---|
| 525,664 | Germany | May 27, 1931 |

OTHER REFERENCES

"La Ricerca Scientifica," vol. 10 (1939), pages 1143 and 1144; article by Sella.